United States Patent Office
3,461,117
Patented Aug. 12, 1969

3,461,117
3α,20 - DIACETOXY - 16β - LOWER ALKYL - 17(20)-OXIDO-PREGNANE-11-ONE AND INTERMEDIATE IN THE PREPARATION THEREOF
Richard Rausser, Union, and Eugene P. Oliveto, Glen Ridge, N.J., assignors to Schering Corporation, Bloomfield, N.J., a corporation of New Jersey
No Drawing. Continuation-in-part of application Ser. No. 673,141, July 22, 1957. This application Aug. 18, 1960, Ser. No. 50,314
Int. Cl. C07c 173/00, 169/36
U.S. Cl. 260—239.55
4 Claims This application is a continuation-in-part of application Ser. No. 673,141, filed July 22, 1957.

This invention relates to a new group of steroid intermediates and with methods for the conversion of these intermediates into a new group of alkylated steroid compounds. More particularly, this invention is concerned with steroid intermediates which are useful in the preparation of 16β-alkyl-Δ⁴-pregnenes and their Δ¹-analogs.

We have found that the 16β-alkylated steroid compounds, and particularly the 16β-methylated steriod compounds, which are prepared from the novel intermediates of this invention are valuable in the treatment of inflammatory diseases such as arthritis. These new 16β-alkylated steroid compounds are represented by formulae A and B on page 9 and are disclosed in our copending applications Ser. Nos. 673,141 now abandoned, filed July 22, 1957, and 733,843, now Pat. No. 3,164,618 filed May 8, 1958, of which the instant application is a continuation. In said formulae, X may be O, (H, αOH), or (H, βOH); R may be H or a carboxylic acyl radical (preferably one containing from 1–8 carbon atoms such as, for example, a lower alkanoyl radical, e.g. acetate, propionate, benzoate, phthalate, dimethyl acetate, trimethyl acetate, tert.-butyl acetate, phenoxy acetate, thiophene carboxylate, nicotinate, and the like), and $R^1$ is a lower alkyl group such as, for example, β-methyl, β-ethyl, β-propyl, β-isopropyl, β-butyl, β-tert.-butyl, and the like. Those compounds wherein X represents (H, αOH), while not therapeutically active per se, are readily converted by known oxidative techniques into 11-keto compounds which possess physiological activity. Particularly preferred are those compounds wherein X is O or (H, βOH); R is the acetate radical and $R^1$ is the methyl group; the $\Delta^{1,4}$-compounds being the more potent.

The addition of the 16β-alkyl group appears to prolong the duration of action of the steroid over that shown by their non-methylated analogs. In addition, the 16β-alkylation of steroids possessing anti-inflammatory properties confers on the parent steroids the property of naturesis and diuresis. As a result, steroid compounds which possess anti-inflammatory properties, but which are limited in their usefulness in the treatment of disease because of their inherent sodium retaining effects, have their usefulness extended by 16β-alkylation. It is clear, therefore, that the discovery of steroid intermediates which are readily convertible to the 16β-alkylated steroid compounds discussed above is a valuable contribution to the pharmaceutical art.

Conversion of the novel intermediates of this invention into 16-alkylated steroid compounds is described hereinafter in detail and is further illustrated by the sequence of reactions shown on pages 9, 10 and 11. For purposes of illustration, merely, the preferred methyl and acetate groups are employed in the following description, as well as in the reaction sequences, as the 16β-alkyl radical and the 21-acyl substituent, respectively. No limitation, however, is intended thereby except as defined by the appended claims.

As the starting material in the ultimate preparation of the 16β-alkylated steroid compounds described above, we prefer to employ the easily available substance 16-pregnene-3α-ol-11,20-dione-3-acylate (i.e. acetate) (I) as shown in reaction sequence A. Reaction of such ester with diazomethane gives in excellent yield, the pyrazoline (e.g. alkylenediazo) intermediate 16,17α-alkylidinediazopregnane-3α-ol-11,20-dione 3-acetate (II). Compound (II) upon pyrolysis at, or above, its melting point is converted into 16-methyl-16-pregnene-3α-ol-11,20-dione 3-acetate (III). Where the 16β-ethyl, 16β-propyl or 16β-butyl derivative is desired, for example, the corresponding diazoethane, diazopropane or diazobutane is employed instead of diazomethane in the above reaction. Although we prefer to pyrolize the pyrazoline by heating above its melting point, such pyrolysis may also be effected by heating the substance in a high boiling solvent, such as p-cymene, or Tetralin and the like. The unsaturation in the D-ring is conveniently removed by reductive hydrogenation preferably in the presence of a catalyst, such as palladium, whereupon there is obtained 16β-methyl-pregnane-3α-ol-11,20-dione 3-acetate (IV).

In order to introduce a hydroxyl group at C–17, we have found that the C–20 keto group of IV can be easily converted into an enol-acetate by refluxing IV with acetic anhydride and a strong acid, such as p-toluenesulfonic acid, for example. We prefer not to isolate the enol-acetate but rather react said substance in situ with a peroxy acid, such as peracetic acid, whereby a second intermediary non-isolated product, being a 17,20-epoxide, is obtained. Treatment of the reaction mixture with alkali hydrolyzes the epoxide in situ and thereby forms 16β-methyl-pregnane-3α,17α-diol-11,20-dione (V). In this step, whereby the hydroxyl group is introduced at C-17, other acetylating agents, such as isopropenyl acetate, may be equally used in place of acetic anhydride. Furthermore, the strong acid catalyst is not necessarily limited to p-toluenesulfonic acid, since other strong acids such as perchloric acid are equally effective to produce the intermediate enol-acetate. As indicated above, the enol-acetate is converted to the respective 17,20-epoxide by means of a peroxy acid, as exemplified by peracetic, perbenzoic, monoperphthalic, pertifluoroacetic acids and the like.

Acetoxylation of the C-21 methyl group is effected in the conventional manner, such as by bromination of the C-21 methyl group, followed by reaction of the bromo-compound with sodium or potassium acetate, whereby 16β - methylpregnane - 3α,17α,21 - triol-11,20-dione 21-acetate (VI) is formed. Although acetoxylation has been shown by way of illustration, it will be apparent to one skilled in the art, that other carboxyacyloxylations, such as the introduction of a propionoxy group for example, may analogously be effected.

In order to obtain the 3-keto-$\Delta^4$ or 3-keto-$\Delta^{1,4}$-system, compound (VI) is further transformed as follows: The hydroxyl group at C-3 is converted to a keto group, preferably by means of N-bromoacetamide whereby VII is produced. It is apparent that other equivalent oxidizing agents can be employed in this step, such as N-bromosuccinimide, chromium trioxide-pyridine, chromium trioxide-acetone-sulfuric acid mixture and the like. The $\Delta^4$-double bond is now conveniently introduced into the A-ring by brominating VII in the conventional manner whereby the intermediary bromo-compound (VIII) is formed, which may or may not be isolated. Although we prefer to halogenate with bromine, other halogenating agents such as chlorine are equally effective. Dehydrohalogenation of VIII in a conventional manner such as by reaction with semicarbazide followed by hydrolysis of the so-formed 3-mono-semicarbazone, or by refluxing with dimethylformamide optionally in the presence of a lithium chloride, or by refluxing with organic bases such as collidine, cause elimination of hydrogen halide and insertion of the $\Delta^4$-double bond, yielding 16β-methylcortisone 21-acetate (IX). Compound (IX) may be saponified so as to produce the diol-trione, X, by reacting the former with hydrolytic agents such as aqueous methanolic potassium bicarbonate or with such reagents as sodium carbonate, sodium hydroxide, sodium alkoxides, and acids such as p-toluenesulfonic acid. 16β-methylcortisone (X) may now be re-esterified at C-21 with any acid residue which is preferred. We have found that, as is generally known in the art, esterification enhances the duration of activity of the steroid alcohol and provides for a compound which may be administered parenterally. We have found that using acid residues, such as obtained from acetic, propionic, trimethylacetic, t-butylacetic, cyclopentylpropionic, furoic, phenoxyacetic and the like, provide useful esters. Similarly, half-esters of dibasic acids, such as obtained from phthalic, succinic, tartaric, citric and the like, provide for esters which can be solubilized by formation of a salt of the free carboxyl group with an alkali metal, such as sodium. In place of the dibasic organic acids, there may be used inorganic acids, such as phosphate and the like, thus producing a dihydrogen phosphate ester which itself can be further solubilized by salt formation.

Introduction of the $\Delta^1$-bond is preferably carried out by subjecting IX or X to the microbiological action of a dehydrogenating microorganism. We prefer to utilize Bacillus sphaericus (A.T.C.C. 7055) or Corynebacterium simplex (A.T.C.C. 6946) according to analogous procedures described in Belgian Patent No. 540,478. It is essential, however, that the compound subjected to fermentative dehydrogenation contain at least a 3-keto-$\Delta^4$-system and thus the first opportune time to insert the $\Delta^1$-bond is after the formation of compound IX or compound X. There is thus produced 16β-methyl-1,4-pregnadiene-17α,21-diol-3,11,20-trione.

The dehydrogenation of the A-ring whereby the $\Delta^1$-bond is inserted may also be accomplished by methods now known, such as by reacting the pregnene IX or the pregnane VII with selenium dioxide, for example, at elevated temperatures or by the well-known methods of halogenating and dehydrohalogenating.

This latter dehydrogenative procedure is exemplified by reaction sequence B whereby the pregnane VII is dihalogenated preferably with bromine, thus forming the intermediary 2,4-dibromo - 16β - methylpregnane-17α,21-diol-3,11,20-trione 21-acetate (XII). Didehydrobromination with basic agents, preferably dimethylformamide, produces the 21-acetate of 16β-methylprednisone (XIII). Compound XIII may be saponified so as to produce 16β-methylprednisone (XI) by use of any of the hydrolytic agents described above. It is obvious that at the final state of 16β-methylprednisone, various ester groups may be introduced at C-21.

The foregoing reaction sequence and discussions have applied to the preparation of compounds containing a keto function at C-11. It is apparent that if any of the starting materials contains a hydroxyl group at C-11, said group will be carried through the series of reactions. However, keeping in mind the availability of the original starting material, 16-pregnene-3α-ol-11,20-dione 3-acetate (I), we prefer to initially carry out the recations so as to produce 11-keto substances and when required, reduce the 11-keto group to an 11-hydroxyl group preferably having the β configuration. Such a transformation is outlined in reaction sequence C whereby the 3,20-bis-semicarbazone (XIV) of 16β-methylcortisone acetate (IX) is formed from the reaction of IX with semicarbazide. Having now protected the sensitive 3,20-diketo groups, the 11-keto function is reduced with sodium borohydride in aqueous tetrahydrofuran, thus yielding the bis-semicarbazone of 16β-methylhydrocortisone (XV). The substituted groups at C-3 and C-20 are removed in a conventional manner, for example, by means of pyruvic acid, or by hydrolytic procedures such as dilute hydrochloric acid or nitrous acid thus yielding 16β-methylhydrocortisone (XVI).

Other methods of protecting the 3-keto groups may be employed, such as forming a 3,20-bis-ethylene ketal and then reducing the 11-keto group by means of sodium borohydride, lithium borohydride, or lithium aluminum hydride and the like. Acid hydrolysis of the 11-hydroxy-bis-ketal so formed yields 16β-methyl-hydrocortisone (XVI).

16β-methylhydrocortisone (XVI) may be converted to 16β-methylprednisolone (XVII) by means of the microbiological fermentation or chemical methods described above for the conversion of 16β-methylcortisone to 16β-methylprednisone. Similarly, 16β-methylprednisolone (XVII) may be esterified according to any of the well-known techniques so as to produce a 21-acetate, such as XVIII.

Alternative to the foregoing, 16β-methylprednisone 21-acetate (XIII) itself may be converted to 16β-methyl-prednisolone 21-acetate (XVIII), by first selectively protecting the 3-20-diketo groups as described above for the mono-enes and then selectively reducing the 11-keto function.

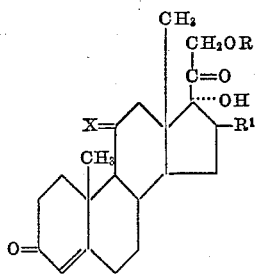
A

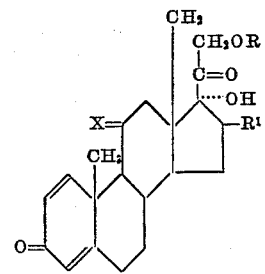
B

Sequence A:
16-pregnene-3α-ol-11,20-dione 3-acetate ⟶

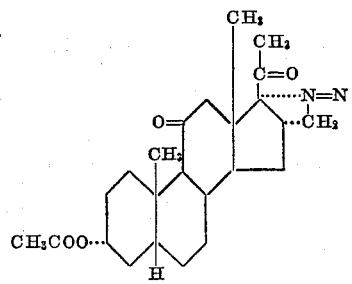

I

II

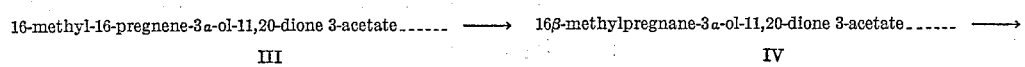

16-methyl-16-pregnene-3α-ol-11,20-dione 3-acetate ⟶ 16β-methylpregnane-3α-ol-11,20-dione 3-acetate ⟶

III

IV

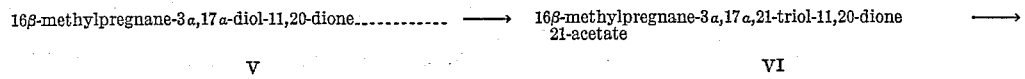

16β-methylpregnane-3α,17α-diol-11,20-dione ⟶ 16β-methylpregnane-3α,17α,21-triol-11,20-dione 21-acetate ⟶

V

VI

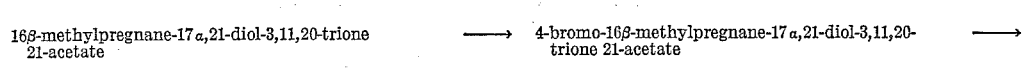

16β-methylpregnane-17α,21-diol-3,11,20-trione 21-acetate ⟶ 4-bromo-16β-methylpregnane-17α,21-diol-3,11,20-trione 21-acetate ⟶

VII

VIII

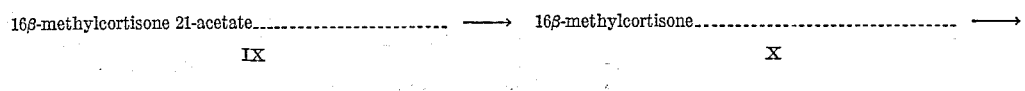

16β-methylcortisone 21-acetate ⟶ 16β-methylcortisone ⟶

IX

X

16β-methylprednisone

XI

Sequence B:
16β-methylpregnane-17α,21-diol-3,11,20-trione 21-acetate ⟶ 2,4-dibromo-16β-methylpregnane-17α,21-diol-3,11,20-trione 21-acetate ⟶

VII

XII

16β-methylprednisone 21-acetate

XIII

Sequence C:
16β-methylcortisone 21-acetate ⟶ 16β-methylcortisone 3,20-bis-semicarbazone 21-acetate ⟶

IX

XIV

16β-methylhydrocortisone; 3,20-bis-semicarbazone ⟶ 16β-methylhydrocortisone ⟶

XV

XVI

16β-methylprednisolone ⟶ 16β-methylprednisolone 21-acetate ⟶

XVII

XVIII

The following examples are illustrative of the methods of manufacture and of the compounds produced. It is understood, however, that such examples in no way limit the invention, said invention being limited only as defined in the appended claims.

EXAMPLE 1

16β-methylcortisone 21-acetate (A) Product from the reaction of 16-pregnene-3α-ol-11,20-dione 3-acetate and diazomethane.—A solution of 3.72 grams of 16-pregnene-3α-ol-11,20-dione 3-acetate in 5 ml. of methylene chloride is added to a solution of about 1 gram of diazomethane in 70 ml. of ether which had been cooled to −10° C. The mixture is kept at 0° C. for four hours, then allowed to warm up to room temperature. The resulting pyrazoline crystallizes directly from the reaction mixture to yield 3.32 g., M.P. 199–200° C. dec., [α]$_D$+149.6° (dioxane).

Analysis.—Calcd. for $C_{24}H_{34}O_4N_2$: C, 69.23; H, 8.27; N, 6.76. Found: C, 69.51; H, 7.98; N, 6.69.

(B) 16-methyl-16-pregnene - 3α - ol-11,20-dione 3-acetate.—The pyrazoline of Example 1A (3.00 g.) is heated under reduced pressure to about 210° C. until the evolution of nitrogen ceases. The resulting oil is cooled to room temperature, then crystallized by the addition of ether.

The precipitate is filtered and dried, yielding 2.12 g. of 16-methyl-16-pregnene-3α-ol-11,20-dione 3-acetate, M.P. 163–166° C., [α]_D+69.9° (dioxane) λmax 248 mμ (ε 10,800).

*Analysis.*—Calcd. for $C_{24}H_{34}O_4$: C, 74.57; H, 8.87. Found: C, 74.85; H, 8.55.

(C) 16β-methylpregnane - 3α - ol-11,20-dione 3-acetate.—A solution of 12.0 g. of the 16-pregnene compound of Example 1B in 250 ml. of glacial acetic acid is hydrogenated at room temperature and atmospheric pressure in the presence of 3.0 g. of 10% palladium on charcoal catalyst. After the reduction is completed (about 1.5 hours), the catalyst is removed by filtration, and the filtrate concentrated under reduced pressure to about 100 ml. The residue is poured into water, and the precipitated solid filtered, washed and dried, yielding 11.4 g. of impure 16β-methylpregnane - 3α - ol-11,20-dione 3-acetate, M.P. 148–155° C. After recrystallization from acetone-hexane there is obtained 8.40 g. of the product of this example, M.P. 160–163° C. no U.V. absorption at 220–300 mμ, [α]_D+93.6° (dioxane).

*Analysis.*—Calcd. for $C_{24}H_{38}O_4$: C, 74.19; H, 9.34. Found: C, 74.37; H, 9.06.

(D) 16β-methylpregnane-3α,17α-diol-11,20 - dione.—A solution of 6.77 g. of 16β-methylpregnane-3α-ol-11,20-dione 3-acetate, in 156 ml. of acetic anhydride containing 3.89 g. of p-toluenesulfonic acid is kept at 100° C. for six hours; during which time about 16 ml. of distillate is removed every half hour by the application of vacuum. The resulting oily residue is dissolved in 80 ml. of benzene and washed three times with water, then with a solution of 1.55 g. of sodium acetate in 20 ml. of water. The benzene layer is dried over magnesium sulfate, and then stirred for 18 hours at 25° C. with a mixture of 0.52 g. of sodium acetate in 12 ml. of commercial 40% peracetic acid. Excess peracetic acid is then destroyed by the dropwise addition of a solution of 15.5 g. of sodium sulfite in 52 ml. of water, while maintaining the temperature between 10–20° C. An additional 1.57 g. of sodium sulfite is then added, and the mixture stirred overnight until a starch-iodide test is negative. The benzene layer is separated, washed three times with water, and evaporated. To the resulting residue which is dissolved in 345 ml. of methanol, there is added a solution of 3.62 g. of sodium hydroxide in 39.5 ml. of water, and the mixture refluxed for 15 minutes. After neutralization with 4 ml. of glacial acetic acid, the solution is concentrated under reduced pressure to a volume of about 50 ml. This concentrate is poured into a mixture of ice and water and the solid which precipitates is filtered and dried, yielding 6.69 g. of impure 16β-methylpregnane-3α-17α-diol-11,20-dione, M.P. 105–140° C. This was chromatographed on Florisil, and the material eluted with 33–50% ether hexane was combined and crystallized from acetone-hexane, yielding 2.09 g. of 16β-methylpregnane-3α,17α-diol-11,20-dione, M.P. 181.5–185° C. [α]_D+83.6 (dioxane).

*Analysis.*—Calcd. for $C_{22}H_{34}O_4$: C, 72.89; H, 9.45. Found: C, 72.82; H, 9.25.

16β - methylpregnane-3α,17α-diol-11,20-dione 3-acetate is prepared by adding to 1 gram of the corresponding 16β-methylpregnane-diol a solution of 0.5 ml. of acetic anhydride in 2.3 ml. of pyridine. After standing one hour at room temperature, the reaction mixture is poured into ice and hydrochloric acid. The resulting solid is filtered, dried, and recrystallized from acetone-hexane to yield 16β-methylpregnane-3α,17α-diol-11,20-dione 3-acetate, M.P. 169–172° C. Its infrared spectrum indicates the presence of an acetate, hydroxyl and two ketonic groups.

*Analysis.*—Calcd. for $C_{24}H_{36}O_5$: C, 71.25; H, 8.97. Found: C, 71.29; H, 8.92.

(E) 16β-methylpregnane - 3α,17α,21-triol-11,20 - dione 21-acetate.—A solution of 362 mg. of 16β-methylpregnane-3α,17α-diol-11,20-dione in 18 ml. of C.P. Chloroform (containing a few drops of chloroform previously saturated with hydrogen bromide) is brominated at −25° C. by the addition (over a three hour period) of 165 mg. of bromine in 10 ml. of chloroform. After removal of the solvent under reduced pressure, 10 ml. of dimethylformamide and one gram of sodium acetate are added. The mixture is stirred at 60° C. for two hours, allowed to stand overnight at room temperature, then heated another two hours at 60° C. The mixture is then poured into water, and the precipitated solid filtered and dried, yielding 370 mg. of impure 16β-methylpregnane-3α,17α,21-triol-11,20-dione 21-acetate, M.P. 192–203° C. Recrystallization from acetone-hexane gives 280 mg. of the product of this example, M.P. 199–205° C. The analytical sample, after another recrystallization, melts at 200–205.5° C.

*Analysis.*—Calcd. for $C_{24}H_{36}O_6$: C, 68.54; H, 8.63. Found: C, 68.79; H, 8.39.

(F) 16β-methylpregnane-17α,21-diol-3,11,20-trione 21-acetate.—A solution of 180 mg. of 16β-methylpregnane-3α,17α,21-triol-11,20-dione 21-acetate, in 30 ml. of 80% acetone-water is cooled to 10° C. One drop of concentrated hydrochloric acid is added, along with 150 mg. of N-bromosuccinimide, and the mixture allowed to react 22 hours at 10° C. in the dark. Excess sodium sulfite solution is then added, and the mixture concentrated under reduced pressure to a small volume from which precipitates 120 mg. of impure 16β-methylpregnane-17α,21-diol-3,11,20-trione 21-acetate, M.P. 190–195° C. dec. Purification is effected by means of zinc dust in aqueous acetone containing 2 drops of acetic acid. The zinc is removed by filtration, the filtrate concentrated, and hot water added to crystallize 100 M.G. of the product of this example, M.P. 198–202° C.

(G) 4β-bromo-16β-methylpregnane-17α,21-diol-3,11,20-trione 21-acetate.—A solution of 84 mg. of 16β-methyl-pregnane-17α,21-diol-3,11,20-trione 21-acetate in 3-ml. of tert.-butyl alcohol and 3 ml. of methylene chloride is brominated at 30–35° C. by the rapid addition of a solution of 32 mg. of bromine in 3 ml. of tert.-butyl alcohol. After bromination is complete (1¾ hours), the solution is evaporated to dryness under reduced pressure. The residue is slurried with water, filtered and dried to yield 90 mg. of 4β-bromo-16β-methylpregnane-17α,21-diol-3,11, 20-trione 21-acetate M.P. 115–130° C. dec., which is of sufficient purity for the conversion described in the following procedure.

(H) 16β-methylcortisone 21-acetate.—The 4β-bromo-16β-methylpregnane-17α,21-diol-3,11,20-trione 21-acetate of above Example 1G is dissolved in a mixture of 30 mg. of semicarbazide, 4 ml. of tert.-butyl alcohol and 2 ml. of methylene chloride, and stirred in a nitrogen atmosphere for two hours at 25–30° C. After removing the solvent under reduced pressure, the residue is dissolved in 5 ml. of 80% acetic acid-water along with 70% excess pyruvic acid, and the reaction mixture allowed to stand at room temperature for 20 hours. The solution is brought to about pH 7 with dilute (5%) sodium hydroxide, and then is extracted with methylene chloride. The organic extracts are evaporated to a residue, and the residue chromatographed on Florisil. Crystalline material (25 mg.) obtained from the 50% ether-hexane and 100% ether eluates, on crystallization from acetone-hexane yields 20 mg. of 16β-methylcortisone 21-acetate, M.P. 198–208° C.

$\lambda_{max.}^{MeOH}$ 238 mμ (ε 12,800)

EXAMPLE 2

16β-methylcortisone

One gram of 16β-methylcortisone 21-acetate (prepared as in Example 1) is dissolved in 25 ml. of methanol and 5 ml. of water containing 0.2 g. of potassium bicarbonate. This solution is refluxed for ½ hour, then concentrated under reduced pressure. Water is added to the residue, and the resulting precipitate is filtered and dried. Crystallization from acetone-hexane gives 16β-methylcortisone.

EXAMPLE 3

16β-methylhydrocortisone (A) 16β-methylcortisone 21-acetate 3,20-bis-semicarbazone.—A mixture of 5.0 g. of 16β-methylcortisone, 8.3 g. of semicarbazide hydrochloride, 6 g. of pyridine, 50 ml. of water and 200 ml. of methanol is refluxed for 16 hours. The solution is concentrated to about 60 ml., then poured into water to precipitate 16β-methylcortisone 21-acetate 3,20-bis-semicarbazone.

(B) 16β-methylhydrocortisone 3,20-bis-semicarbazone.—A solution of 6.0 g. of the bis-semicarazone of above Example 3(A) and 4 g. of potassium borohydride in 200 ml. of tetrahydrofuran and 100 ml. of water is refluxed for 6 hours. The solution is cooled, and acetic acid added to pH 5.5. The organic solvent is distilled and the solids in the residue are filtered to give 16β-methylhydrocortisone 3,20-bis-semicarbazone.

(C) 16β-methylhydrocortisone.—Under a nitrogen atmosphere, 5.0 g. of the bis-semicarbazone of above Example 3(B) is dissolved in 250 ml. of 2,4 N hydrochloric acid. The solution is cooled to 5° C., then 2.5 g. of sodium nitrite in 25 ml. of water is added over a 15 minute period at 5° C. The reaction mixture is stirred an additional 30 minutes, then cooled to below 15° C., neutralized with 20% sodium hydroxide, and extracted several times with chloroform. The solvent is evaporated under reduced pressure to give a solid residue which, after crystallization from acetone-hexane, yields 16β-methylhydrocortisone.

EXAMPLE 4

16β-methylhydrocortisone 21-acetate

To one gram of 16β-methylhydrocortisone, prepared as in Example 3, is added 0.5 ml. of acetic anhydride in 2.3 ml. of pyridine. After standing for one hour at room temperature, the mixture is poured into ice and hydrochloric acid. The resulting precipitate is filtered and recrystallized from aqueous methanol to yield 16β-methylhydrocortisone 21-acetate.

EXAMPLE 5

16β-methylprednisone 21-acetate (A) 2,4-dibromo-16β-methylpregnane-17α,21-diol-3,11,20-trione 21-acetate.—A solution of 167 mg. 16β-methylpregnane-17α,21-diol-3,11,20-trione 21-acetate, the compound of Example1(F), in 3 ml. of dioxane is dibrominated in positions 2 and 4 by the rapid addition of 130 mg. of bromine in 1 ml. of dioxane at room temperature. The solution is poured into water and the precipitated solid is filtered, yielding 180 mg. of 2,4-dibromo-16β-methylpregnane-17α,21-diol-3,11,20-trione 21-acetate of sufficient purity to be used in the conversion described in the following procedure.

(B) 16β-methylprednisone 21-acetate.—The 2,4-dibromide (180 mg.) as prepared in above Example 5(A) is dehydrobrominated by refluxing for 2 hours with 4 ml. of dimethylformamide containing 30 mg. of calcium carbonate. The mixture is poured into dilute hydrochloric acid and extracted with methylene chloride. The organic extract is evaporated to a residue (150 mg.), which is chromatographed on Florisil. The fractions obtained by elution with 20% ether-hexane are crystallized from acetone-hexane to give 40 mg. of 16β-methylprednisone 21-acetate, M.P. 210–216°. One further crystallization gave M.P. 215–218°, $$\lambda_{max.}^{MeOH}\ 237\ m\mu\ (\epsilon\ 10{,}500)$$

EXAMPLE 6

16β-methylprednisone

16β-methylprednisone 21-acetate (0.5 g.), the compound of Example 5, when hydrolyzed by means of aqueous alcoholic potassium bicarbonate in the manner described in Example 2 yields 16β-methylprednisone.

An alternative method of the preparation of the compound of this example is as follows:

*Bacillus sphaericus* var. *fusiformis* (A.T.C.C. 7055) is incubated on a nutrient agar (composed of Bacto-beef extract, 3 g.; Bacto-peptone, 5 g.; sodium chloride, 8 g.; agar, 15 g.; tap water, 1 liter) for 24 hours at 28° C.

To 100 ml. of a sterile nutrient broth (composed of Bacto-beef extract, 3 g.; Bacto-peptone, 5 g.; per liter of tap water) in a 300 ml. flask is added one loopful of the incubated culture and the broth mixture is further incubated for 24 hours at 28° C. on a shaking machine. The broth culture so obtained is employed as in inoculum (1%).

Into each of ten flasks containing 100 ml. of sterile nutrient broth is added 1 ml. of the inoculum. The flasks are agitated on a rotary shaker for 8 hours at 28° C. at 240 strokes per minute. After this growth period, a solution of 25 mg. of 16β-methylcortisone, the compound of Example 2, in 0.5 ml. of methanol is aseptically added to each flask which in turn is reshaken and incubated for an additional 24 hours. The final pH is 7.8.

The contents of the flasks are then combined and extracted three times with 2 liters of chloroform per extraction. The combined chloroform extracts are evaporated to dryness yielding 310 mg. of crude product. The crude steroid is purified by chromatography on a chromatographic system described by G. M. Shull, Abstracts of Papers of the 126th Meeting of the American Chemical Society, Dec. 12–17, 1954, page 9a, paper No. 24. Chromatographic evaluation shows a quantitative conversion of the starting material to the diene when an authentic sample of the 16β-methylprednisone is used as a control.

Alternatively, the crude product is recrystallized from acetone affording 225 mg. of 16β-methylprednisone.

EXAMPLE 7

16β-methylprednisolone

16β-methylhydrocortisone, the compound of Example 3, is fermented by means of *Bacillus sphaericus* var. *fusiformis* (A.T.C.C. 7055) in the manner described in the alternate procedure of Example 6 to produce 16β-methylprednisolone.

EXAMPLE 8

16β-methylprednisolone 21-acetate

16β-methylprednisolone of Example 7 is treated with acetic acid and pyridine in the manner described in Example 4 to yield 16β-methylprednisolone 21-acetate.

We claim:
1. 3α,20-diacetoxy-16β-lower alkyl-17(20)-pregnene-11-one.
2. 3,α20-diacetoxyl-16β-methyl-17(20)-pregnene-11-one.
3. 3α,20-diacetoxy-16β-lower alkyl-17(20)-oxido-pregnane-11-one.
4. 3α,20-diacetoxy-16β-methyl-17(20)-oxido-pregnane-11-one.

References Cited

UNITED STATES PATENTS 2,790,799　4/1957　Djerassi _____ 260—239.55
2,932,656　4/1960　Day _____ 260—397.45

FOREIGN PATENTS 736,182　9/1955　Great Britain.
741,732　12/1955　Great Britain.
748,914　5/1956　Great Britain.

OTHER REFERENCES

Mueller et al.: Bull. Soc. Chim., France (1956), pp. 1457–9 relied on.

ELBERT L. ROBERTS, Primary Examiner

U.S. Cl. X.R.

195—51; 260—239, 397

PO-1050
(5/69)

UNITED STATES PATENT OFFICE
CERTIFICATE OF CORRECTION

Patent No. 3,461,117   Dated August 12, 1969

Inventor(s) Richard Rausser and Eugene P. Oliveto

It is certified that error appears in the above-identified patent and that said Letters Patent are hereby corrected as shown below:

Column 3, line 16, "pertifluoroacetic" should read ---pertrifluoroacetic---. Column 4, line 20, "16β-methylpregn 17α.21-" should read ---16β-methylpregnane-17α,21- ---. Column 4, line 37, "the recations" should read ---the reaction Column 6, at the top, that portion of structural formula B rea

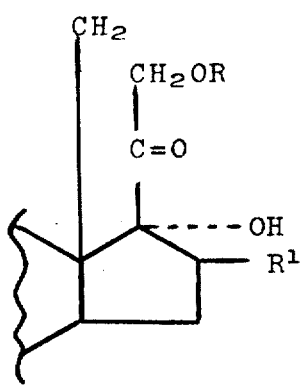   should read   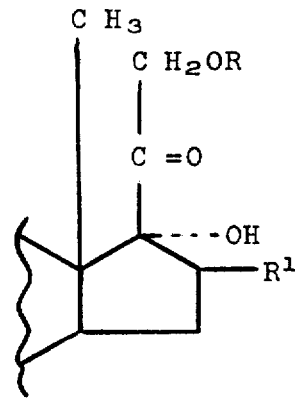

Column 7, line 51, "-3α-17-diol" should read --- -3α,17α-diol--
Column 8, line 31 "100 M.G." should read ---100 mg.---.
Column 10, line 52, claim 2, "3,α20-" should read ---3α,20- --

SIGNED AND
SEALED
MAY 5 1970

(SEAL)
Attest:

Edward M. Fletcher, Jr.
Attesting Officer

WILLIAM E. SCHUYLER,
Commissioner of Paten